United States Patent [19]

Allkins

[11] Patent Number: 4,920,564
[45] Date of Patent: Apr. 24, 1990

[54] MOISTURE BARRIER ASSEMBLY

[75] Inventor: Martin D. Allkins, Ipswich, England

[73] Assignee: British Telecommunications public company limited, London, England

[21] Appl. No.: 271,816

[22] Filed: Nov. 16, 1988

[30] Foreign Application Priority Data

Nov. 19, 1987 [GB] United Kingdom ............... 8727072

[51] Int. Cl.⁵ .................. H04M 1/03; H04R 1/28
[52] U.S. Cl. .................. 379/437; 379/440; 381/157; 381/189; 181/242
[58] Field of Search ............ 379/437, 439, 440, 441; 381/153, 158, 189, 157; 181/242

[56] References Cited

U.S. PATENT DOCUMENTS 4,424,419  1/1984  Chaput et al. ............... 381/157

FOREIGN PATENT DOCUMENTS 1143233  2/1963  Fed. Rep. of Germany .
2940367  4/1981  Fed. Rep. of Germany .
3133983  2/1983  Fed. Rep. of Germany .
0582593  11/1977  U.S.S.R. ...................... 381/189
2064263  6/1981  United Kingdom ........... 379/437
2064265  6/1981  United Kingdom ........... 379/437
2134745  8/1984  United Kingdom .

Primary Examiner—Jin F. Ng
Assistant Examiner—Wing F. Chan
Attorney, Agent, or Firm—Nixon & Vanderhye

[57] ABSTRACT

A microphone unit for a telephone handset comprises a microphone mount, a microphone mounted in the microphone mount, a mouthpiece detachably fixed to the handset, and a moisture barrier assembly for preventing ingress of moisture into the microphone. The moisture barrier assembly is constituted by a moisture barrier, an annular seal and a support plate. The support plate has a perforated portion covered by, but spaced from, the moisture barrier. The moisture barrier assembly is positioned between the mouthpiece and the microphone mount. Venting means vents a space between the moisture barrier and the microphone. The moisture barrier is constituted by a moisture impermeable film whose peripheral edge portion is fixed to the annular seal. The seal is fixed to the support plate and seals against the front face of the microphone.

12 Claims, 2 Drawing Sheets

MOISTURE BARRIER ASSEMBLY

BACKGROUND OF THE INVENTION

This invention relates to a moisture barrier assembly for the microphone unit of a telephone handset, particularly that of a payphone.

During wet weather, the handset of a payphone may be subject to partial or total loss of forward transmission resulting from the freezing of moisture (probably from a user's breath) which has entered into the transmitter.

In order to alleviate this problem, it is known to fit a moisture barrier into the transmission housing of a payphone handset. A known moisture barrier is a simple disc made of a thin plastics film (for example melinex). Typically, such a disc is held between the parts of a two-piece crimped transmission housing, with the disc overlying the microphone. Unfortunately, the disc tends to separate from the housing, probably due to thermal shock and/or an inaccurate disc fitting process. This disc seperation permits moisture to creep round the disc edge and into the transmitter. Consequently, transmission loss occurs in freezing conditions. The sound holes in the mouthpiece of the handset may also be blocked, which increases the transmission loss.

In an attempt to overcome this problem of moisture creep round the disc edge, another form of known moisture barrier has a thin film plastics disc provided with a surrounding annular support ring. The support ring is self-adhesive so that it can seal against the front of the transmission housing of a payphone handset. The main disadvantage of this type of moisture barrier is that the disc is too close to the mouthpiece, so that any moisture collecting between the disc and the mouthpiece tends to adhere the disc to the mouthpiece, and this leads to loss of transmission. There is also the possibility of the disc being sucked back onto the microphone, which would also lead to transmission losses.

The aim of the invention is to provide an improved moisture barrier assembly for a payphone handset.

SUMMARY OF THE INVENTION

The present invention provides a moisture barrier assembly for the microphone unit of a telephone handset, the microphone unit being constituted by a microphone housing, a microphone mount positioned within the microphone housing, a microphone mounted in the microphone mount, and a mouthpiece detachably fixed to the microphone housing, the moisture barrier assembly being constituted by a support plate, a moisture barrier and a generally annular seal, the support plate having a perforated portion covered by the moisture barrier, the annular seal being fixed to the peripheral portion of the moisture barrier and to the support plate so as to seal, in use, against the front face of the microphone, wherein the moisture barrier is fixed to the support plate so as to be spaced by a predetermined distance from the perforated portion, and venting means are provided for venting the space between the moisture barrier and the microphone.

The invention also provides a microphone unit for a telephone handset, the microphone unit comprising a microphone mount, a microphone mounted in the microphone mount, and a moisture barrier assembly for preventing ingress of moisture into the microphone, the moisture barrier assembly being constituted by a support plate, a moisture barrier, and a generally annular seal, the support plate having a perforated portion covered by the moisture barrier, the annular seal being fixed to the peripheral portion of the moisture barrier and to the support plate so as to seal, in use, against the front face of the microphone, characterised in that the moisture barrier is fixed to the support plate so as to be spaced by a predetermined distance from the perforated portion, and venting means are provided for venting the space between the moisture barrier and the microphone.

In a preferred embodiment, the moisture barrier is a disc of polyester film which has a thickness of substantially 23 microns. The seal may be an annular member made of a resilient material such as polyvinylchloride foam, and may have a thickness of substantially 1.1 mm.

Preferably, one annular surface of the seal is covered with adhesive transfer tape, whereby the seal can be adhered to the support plate, the peripheral edge portion of the film being fixed to the seal by said adhesive transfer tape.

The support plate may be made of a hard plastics material such as polycarbonate, and the perforated portion of the support plate may be a central, stepped portion. Preferably, the annular seal is such that it adheres to the support plate in the region of the support plate surrounding the central stepped portion thereof, whereby the moisture barrier is spaced from the perforated portion by said predetermined distance. Conveniently, that surface of the seal remote from the perforated portion of the support plate is provided with a groove extending from its inner peripheral edge to its outer peripheral edge, said groove constituting venting means. Preferably, the venting means further comprises an annular space formed between the support plate and the microphone, a radial groove formed in the support plate, and an axial groove formed in the internal wall of the microphone mount, the annular space surrounding the annular seal and being contiguous with the groove in the annular seal and with said radial groove, and the radial groove being contiguous with the axial groove in the internal wall of the microphone mount, whereby the venting means extends, in use, from the space between the moisture barrier and the microphone to a space within the handset on that side of the microphone remote from the moisture barrier.

Advantageously, the perforated portion of the support plate is defined by a plurality of circular apertures, the minimum diameter of each of the apertures being 2 mm, and the minimum total cross-sectional area of all the apertures being 100 mm$^2$.

In a preferred embodiment, the support plate is provided with three peripheral equispaced lugs which mate with three complementary recesses formed in the upper edge portion of the microphone mount. Preferably, there are three equispaced axial grooves formed in the internal wall of the microphone mount, whereby one of said axial grooves is aligned with the radial groove in the support plate no matter which way the support plate is mounted on the microphone mount by engagement of their complementary lugs and recesses.

BRIEF DESCRIPTION OF THE DRAWINGS

A payphone handset microphone unit incorporating a moisture barrier assembly constructed in accordance with the invention will now be described in detail, by way of example, with reference to the accompanying drawings, in which.

DESCRIPTION OF PREFERRED EMBODIMENT

Figure 1:
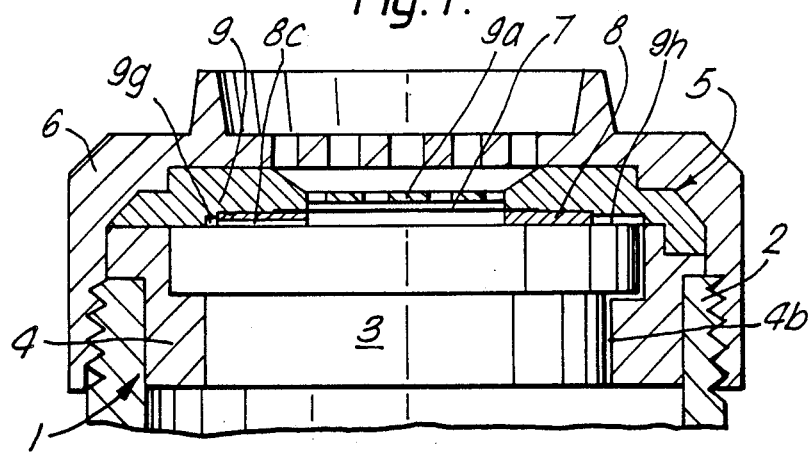
FIG. 1 is a schematic transverse cross-section taken through the microphone unit.
Figure 2:
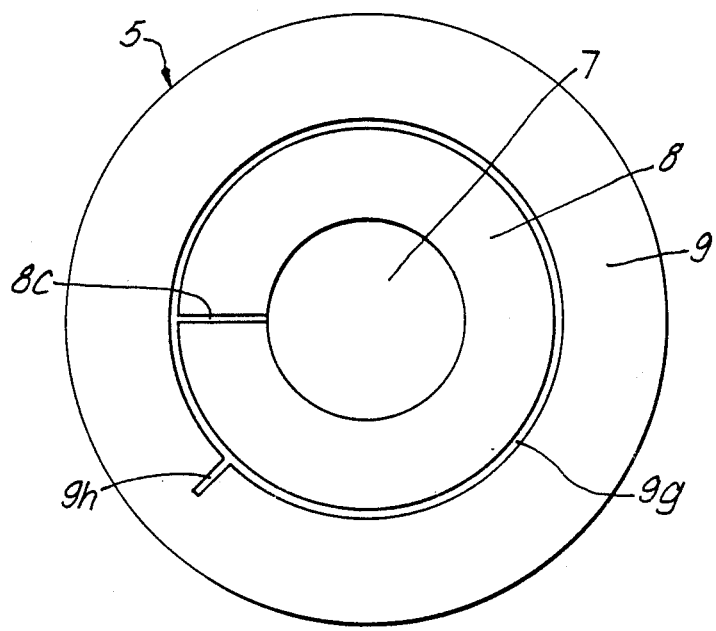
FIG. 2 is an underneath view of the moisture barrier assembly.

Referring to the drawings, FIG. 1 shows the microphone unit 1 of a payphone handset 2. The unit 1 has a microphone (transmitter) 3 supported within a microphone mount 4. The microphone mount 4 is made of compliant rubber, either injection or compression moulded, and is positioned within the handset 2. A moisture barrier assembly 5 is positioned on the microphone mount 4 above the microphone 3. A mouthpiece 6 is screwed onto the handset 2 to trap the moisture barrier assembly 5 between the mouthpiece and the microphone mount 4. The handset 2 and the mouthpiece 6 are made of a plastics material such as polycarbonate.

Figure 4:
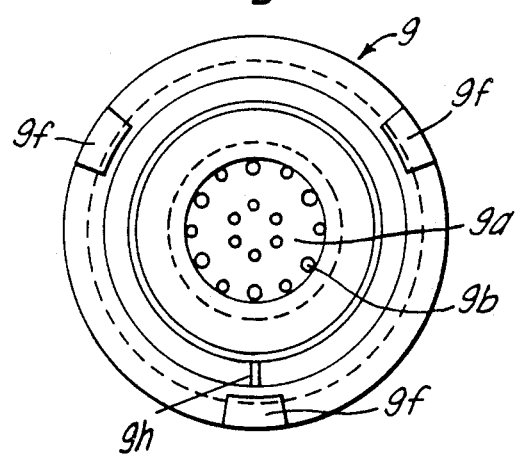
FIG. 4 is a plan view of the moisture barrier assembly.

The moisture barrier assembly 5 is constituted by a disc 7 of coloured polyester, an annular seal 8 made of polyvinylchloride foam, and a support plate 9. The disc 7 has a thickness of 23 microns, and the seal 8 has a thickness of 1.1 mm. The support plate 9 is generally disc-shaped, and is made of a hard plastics material such as polycarbonate. The central portion 9a of the support plate 9 is provided with a plurality of sound holes 9b (see FIG. 4). The holes 9b have a minimum diameter of 2 mm, and their minimum total cross-sectional area is 100 mm$^2$. Alternate holes 9b at the outer edge of the perforated portion 9a (see FIG. 4) preferably have a larger diameter of 3 mm. Alternatively, all the sound holes 9b would have a diameter of 2 mm, in which case there could be six central sound holes equispaced on a circle of radius 6.5 mm and sixteen outer sound holes equispaced on a circle radius 19 mm. This central portion 9a is inwardly stepped from the rear surface 9c of the plate 9 by means of two concentric shoulders 9d and 9e. Three equispaced lugs 9f project outwardly from the rear surface 9c at the circumferential edge thereof. These lugs 9f mate with complementary recesses 4a formed in the top edge surface of the microphone mount 4, thereby locating the support plate 9 on the mount. The support plate 9 locates and protects the actual moisture barrier 7. It also minimises the flow of air across the barrier 7 by acting as a diffuser.

Figure 3:
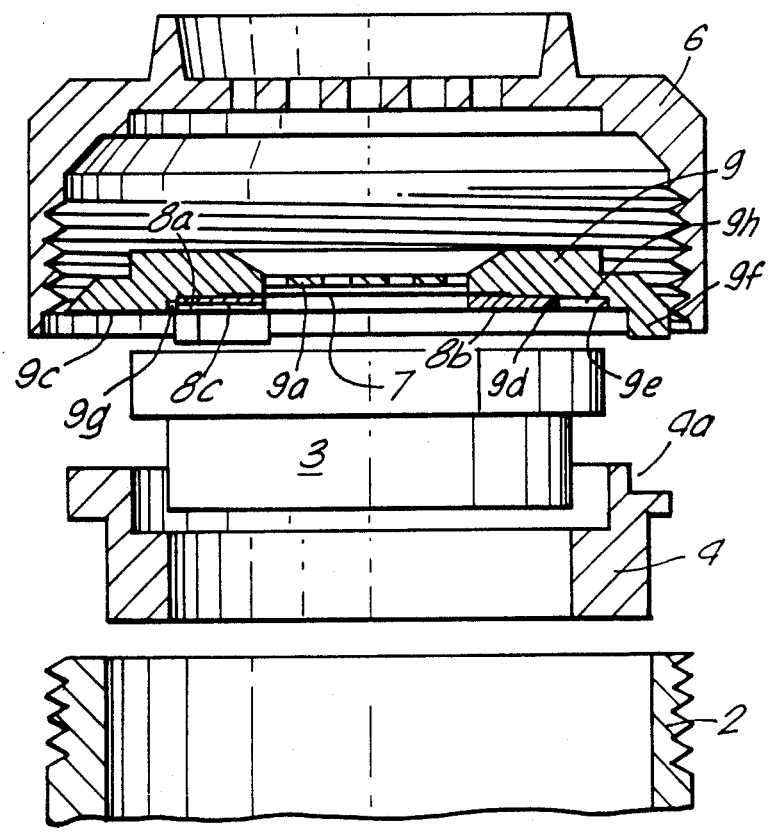
FIG. 3 is an exploded view of the microphone unit.

One surface 8a of the seal 8 is provided with a self-adhesive transfer tape, and the peripheral edge portion of the disc 7 is fixed to the seal by this adhesive. The seal 8 extends outwardly beyond the peripheral edge of the disc 7, so that an annular layer of adhesive remains exposed after the disc has been fixed to the seal. This remaining layer of adhesive is used to fix the seal/disc 8,7 to the plate 9. As can best be seen from FIG. 3, the outer diameter of the seal 8 is such that the seal fits snugly against the shoulder 9d. In this position, the disc 7 forms a moisture impermeable barrier which completely covers the central portion 9a of the support plate 9.

The opposite surface 8b of the seal 8 is provided with a radial groove 8c having a width of 1.0 mm and a depth of 0.5 mm. This groove 8c leads to an annular space 9g (see FIG. 1) formed between the microphone 3 and the plate 9, this space being delimited internally by the outer circumferential edge of the seal 8 and externally by the shoulder 9e. The space 9g, which has a width of 1.0 mm and a depth of 0.5 mm, leads to an axial groove 4b formed in the internal cylindrical wall of the microphone mount 4 via a radial groove 9h formed in the rear surface 9c of the plate 9. The grooves 4b and 9h each have a width of 1.0 mm and a depth of 0.5 mm. The groove 8c, the annular space 9g, and the grooves 9h and 4b constitute an air path for venting the space between the moisture barrier assembly 5 and the microphone 3. In practice, since groove 9h is aligned with one of the lugs 9f (see FIG. 4) which lugs are received in complementary recesses 4a (see FIG. 3) and the internal wall of the microphone mount 4 is provided with three equispaced axial groves 4b, one of the axial grooves will align with the radial groove 9h, thereby allowing the support plate 9 to be positioned on the microphone mount in any of its three possible postions without the risk of obstructing the small airway constituting the venting means.

The moisture barrier assembly 5 described above does not suffer from the disadvantages of known assemblies. In particular, the assembly 5 completely covers the access region from the mouthpiece 6 to the microphone 3, thereby preventing ingress of any moisture into the microphone. Moreover, the stepping of the central portion 9a of the support plate 9 is effective to space the disc 7 sufficiently far away from the sound holes 9b to prevent any moisture gathering in the space between the disc and the portion 9a tending to adhere the disc to that portion. The venting of this space also reduces the possibility of transmission losses arising from barometric equalisation problems. Thus, if the barrier were completely sealed to the front of the microphone, the volume and pressure of air trapped between the microphone and the barrier, and inside the microphone itself, would change with changes in temperature. If the handset 2 was subjected to rapid changes of temperature, this change in pressure would distort the barrier sufficiently to impair transmission before equalisation could occur through air leakage. (As a guide, reducing the temperature from 25° C. to −10° C. would result in a differential force on the barrier of about 1 Kg (F)). By venting the space between the microphone 3 and the barrier 7 to the main body of the handset 2, there is sufficient leakage from this area via the earpiece etc., to prevent transmission losses due to such thermal shock. Furthermore, the grooves 8c, 9h and 4b and the annular space 9g are effective to vent the enclosed sealed volume between the disc 7 and the front face of the microphone 3, thereby avoiding the risk of the disc being sucked onto the front face of the microphone. Thus, the barrier assembly 5 prevents transmission losses which would arise from the barrier 7 engaging either the support plate 9 or the microphone 3. It should also be noted that, by locating the support plate 9 in the microphone mount 4 by means of the three protruding lugs 9f which fit into the recesses 4a in the microphone mount, the handset 2 can be assembled with the greatest freedom. Moreover, the airways constituting the venting means are sufficiently large to accommodate any distortion (and hence misalignment) as the mouthpiece 6 is tightened.

Acoustically, the moisture barrier is quite complicated, as it comprises a series of tuned cavities. However, all the resonances are tuned out of the speech band, by a careful choice of dimensions, so that the net effect on the frequency response is minimal. It is important to note that any change to these dimensions will alter the response and involve further acoustic testing to ensure performance is adequate.

Another advantage of the moisture barrier assembly 5 of the invention in that the holes 9b in the support plate 9 can be positioned so as to be out of alignment with the sound holes in the mouthpiece 6, thereby preventing access to the relatively fragile moisture barrier disc 7 from outside the handset. Earlier moisture assemblies did not have this feature, and were susceptible to vandalism.

It will be apparent that a number of modifications could be made to the moisture barrier assembly. For example, the shape of the moisture barrier could be modified to suit the shape of different telephone handset mouthpieces.

I claim:

1. A microphone unit for a telephone handset, the microphone unit comprising a microphone mount, a microphone mounted in the microphone mount, and a demountable moisture barrier assembly for preventing ingress of moisture into the microphone, the moisture barrier assembly comprising a support plate, a moisture barrier, and a generally annular seal, the support plate having a perforated portion covered by the moisture barrier, the annular seal being fixed to the peripheral portion of the moisture barrier and to the support plate so as to be sealable against the front face of the microphone, wherein the moisture barrier is fixed to the support plate so as to be spaced by a predetermined distance from the perforated portion, and venting passageway means are provided for venting the space between the moisture barrier and the microphone to a space within said handset on that side of the microphone remote from the moisture barrier.

2. A microphone unit according to claim 1, wherein the moisture barrier is a disc of polyester film having a thickness of substantially 23 microns.

3. A microphone unit according to claim 2, wherein the seal is an annular seal made of a resilient material such as polyvinylchloride foam, and has a thickness of substantially 1.1 mm.

4. A microphone unit according to claim 1, wherein one annular surface of the seal is covered with adhesive transfer tape, whereby the seal can be adhered to the support plate, the peripheral edge portion of the moisture barrier being fixed to the seal by said adhesive transfer tape.

5. A microphone unit according to claim 4, wherein the support plate is made of a hard plastics material such as polycarbonate, and the perforated portion of the support plate is a central, stepped portion.

6. A microphone unit according to claim 5, wherein the annular seal is such that it adheres to the support plate in the region of the support plate surrounding the central stepped portion thereof, whereby the moisture barrier is spaced from the perforated portion by said predetermined distance.

7. A microphone unit according to claim 6, wherein that surface of the seal remote from the perforated portion of the support plate is provided with a groove extending from its inner peripheral edge to its outer peripheral edge, said groove comprising the venting means.

8. A microphone unit according to claim 7, wherein the venting means further comprises an annular space formed between the support plate and the microphone, a radial groove formed in the support plate, and an axial groove formed in the internal wall of the microphone mount, said annular space surrounds the annular seal and being contiguous with the groove in the annular seal and with said radial groove, and the radial groove being contiguous with the axial groove in the internal wall of the microphone mount, whereby the venting means extends from the space between the moisture barrier and the microphone to a space within the handset on that side of the microphone remote from the moisture barrier.

9. A microphone unit according to claim 1, wherein the perforated portion of the support plate is defined by a plurality of circular apertures, the minimum diameter of each of the apertures being 2 mm, and the minimum total cross-sectional area of all the apertures being 100 $mm^2$.

10. A microphone unit according to claim 8, wherein the support plate is provided with three peripheral equispaced lugs which mate with three complementary recesses formed in the upper edge portion of the microphone mount.

11. A microphone unit according to claim 10, wherein there are three equispaced axial grooves formed in the internal wall of the microphone mount, the radial groove being so positioned in the support plate that one of said axial grooves is aligned with the radial groove no matter which way the support plate is mounted on the microphone mount by engagement of their complementary lugs and recesses.

12. A demountable moisture barrier assembly for the microphone unit of a telephone handset, the microphone unit comprising a microphone housing, a microphone mount positioned within the microphone housing, a microphone mounted in the microphone mount, and a mouthpiece detachably fixed to the microphone housing, the moisture barrier assembly comprising a support plate, a moisture barrier and a generally annular seal, the support plate having a perforated portion covered by the moisture barrier, the annular seal being fixed to the peripheral portion of the moisture barrier and to the support plate so as to be sealable, against the front face of the microphone, wherein the moisture barrier is fixed to the support plate so as to be spaced by a predetermined distance from the perforated portion, and venting passageway means are provided for venting the space between the moisture barrier and the microphone to said housing.

* * * * *